United States Patent
Kortwig et al.

(10) Patent No.: US 9,126,512 B2
(45) Date of Patent: Sep. 8, 2015

(54) HEADREST FASTENING SYSTEM

(71) Applicant: LEAR CORPORATION, Southfield, MI (US)

(72) Inventors: Carsten Kortwig, Bischofsheim (DE); Arne Schuster, Sindelfingen (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/219,803

(22) Filed: Mar. 19, 2014

(65) Prior Publication Data

US 2014/0333109 A1    Nov. 13, 2014

(30) Foreign Application Priority Data

May 7, 2013   (DE) .......................... 10 2013 208 316

(51) Int. Cl.
| | | |
|---|---|---|
| *A47C 1/10* | (2006.01) | |
| *A47C 7/36* | (2006.01) | |
| *A61G 15/00* | (2006.01) | |
| *B60R 22/28* | (2006.01) | |
| *B60N 2/48* | (2006.01) | |
| *B60N 2/28* | (2006.01) | |

(52) U.S. Cl.
CPC ................ *B60N 2/48* (2013.01); *B60N 2/4882* (2013.01); *B60N 2/2851* (2013.01); *B60N 2/4811* (2013.01); *B60N 2/4814* (2013.01); *B60N 2/4826* (2013.01); *B60N 2/4841* (2013.01); *B60N 2002/4888* (2013.01)

(58) Field of Classification Search
CPC ...... B60N 2/48; B60N 2/2851; B60N 2/4811; B60N 2/4814; B60N 2/4826; B60N 2/4841; B60N 2/4882; B60N 2002/4888

USPC .......................... 297/391, 402, 401, 404, 405
See application file for complete search history.

(56) References Cited

U.S. PATENT DOCUMENTS

| | | | |
|---|---|---|---|
| 3,810,279 A | | 5/1974 | Swick et al. |
| 4,381,633 A | | 5/1983 | MacLeod |
| 5,139,310 A | * | 8/1992 | Itoh ................................ 297/391 |
| 5,257,853 A | * | 11/1993 | Elton et al. ..................... 297/391 |
| 5,868,471 A | * | 2/1999 | Graham et al. ................ 297/397 |
| 6,296,316 B1 | * | 10/2001 | Hann .......................... 297/463.1 |
| 6,412,872 B2 | * | 7/2002 | Takeda et al. .................. 297/391 |
| 6,601,804 B2 | * | 8/2003 | Bisch ............................. 248/118 |
| 7,004,544 B2 | * | 2/2006 | Mitjans ......................... 297/391 |
| 7,393,057 B2 | * | 7/2008 | Fraser ........................... 297/392 |
| 7,992,939 B2 | | 8/2011 | Pozzi |
| 8,348,348 B2 | * | 1/2013 | Eckstein et al. .............. 297/409 |
| 8,915,546 B2 | * | 12/2014 | Schmitz .................... 297/216.12 |

(Continued)

FOREIGN PATENT DOCUMENTS

| | | |
|---|---|---|
| DE | 40 40 454 C1 | 12/1990 |
| DE | 20 2004 009444 U1 | 11/2004 |

*Primary Examiner* — Chi Q Nguyen
(74) *Attorney, Agent, or Firm* — Brooks Kushman P.C.

(57) ABSTRACT

A headrest for use with a vehicle seat that includes a first and second headrest components; and a fastening system for fastening the headrest components together, the fastening system including a male member and female member, the male member including a body defining a release channel configured to accommodate a tool and a flexible protrusion positioned on a periphery of the body, the female member defining a receiving recess configured to receive the flexible protrusion in order to fasten the headrest components together, wherein the first headrest component can be detached from the second headrest component by detaching the male member from the female member.

20 Claims, 4 Drawing Sheets

(56) References Cited

U.S. PATENT DOCUMENTS

| | | |
|---|---|---|
| 2010/0283307 A1 | 11/2010 | Fujita |
| 2012/0146373 A1 | 6/2012 | Onji |
| 2013/0234491 A1* | 9/2013 | Schmitz et al. ............... 297/391 |
| 2014/0197671 A1* | 7/2014 | Frotz ............................ 297/391 |

* cited by examiner

HEADREST FASTENING SYSTEM

CROSS-REFERENCE TO RELATED APPLICATIONS

This application claims priority to German Application No. 10 2013 208 316.5 filed May 7, 2013, the disclosure of which is hereby incorporated by reference in its entirety.

TECHNICAL FIELD

The present disclosure relates to headrests such as those for vehicle seats, and in particular fasteners used in assembling headrests.

BACKGROUND

Vehicle seat assemblies typically include a seat, a back rest connected to the seat, a headrest, and a headrest support bar connecting the back rest with the headrest. A headrest typically includes various components that are joined together using screws. In a manufacturing setting, manually assembling headrests using various screws may require a significant amount of labor and manufacturing time. Some headrest components may be joined together by a combination of clips and screws. One manufacturing concern with the use of clips and screws is that some of the clips may not be firmly fastened. Another manufacturing concern is that an inadequate amount of torque may have been applied to the screws. Manufacturing personnel may also miss one or more screws or clips.

Some headrest components may also be joined together by a combination of welding and screws. Headrests are typically tested for compliance with various safety standards as part of the manufacturing process. If the headrests do not comply with the safety standards, they may have to be disassembled and re-assembled. Non-compliant headrests may have to be scrapped because some pieces are permanently welded together, and it may not be economically efficient to try to disassemble and re-assemble them.

SUMMARY

The present disclosure discloses a headrest that includes a first and second headrest components; and a fastening system for fastening the headrest components together, the fastening system including a male member and female member, the male member including a body defining a release channel configured to accommodate a tool and a flexible protrusion positioned on a periphery of the body, the female member defining a receiving recess configured to receive the flexible protrusion in order to fasten the headrest components together, wherein the first headrest component can be detached from the second headrest component by detaching the male member from the female member.

The present disclosure also discloses a vehicle seat assembly that includes a back rest; a headrest support bar connected to the back rest; and a headrest connected to the headrest support bar, the headrest including at least two headrest components and a fastening system for joining together the at least two headrest components, the fastening system including a female member; and a male member configured to be inserted into the female member, the body of the male member further including a series of flexible protrusions positioned on a first periphery of the body, the female member defining a series of receiving recess on a first female member periphery configured to receive the series of flexible protrusions, wherein the headrest components are joinable together when the series of flexible protrusions are received in the series of receiving recess.

The present disclosure further discloses a headrest for use with a vehicle seat comprising first and second components; a male member attached to the first component, the male member including a body with a series of flexible protrusions positioned on a first periphery of the body; and a female member attached to the second component, the female member configured to accommodate the male member, the female member defining a series of receiving recesses configured to receive the series of flexible protrusions of the male member, wherein the first and second components are assembled together by inserting the male member into the female member until the series of flexible protrusions are received in the series of receiving recesses of the female member.

BRIEF DESCRIPTION OF THE DRAWINGS

FIG. 4b is a side view of another exemplary female member that can be used with the male member of FIG. 4a.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
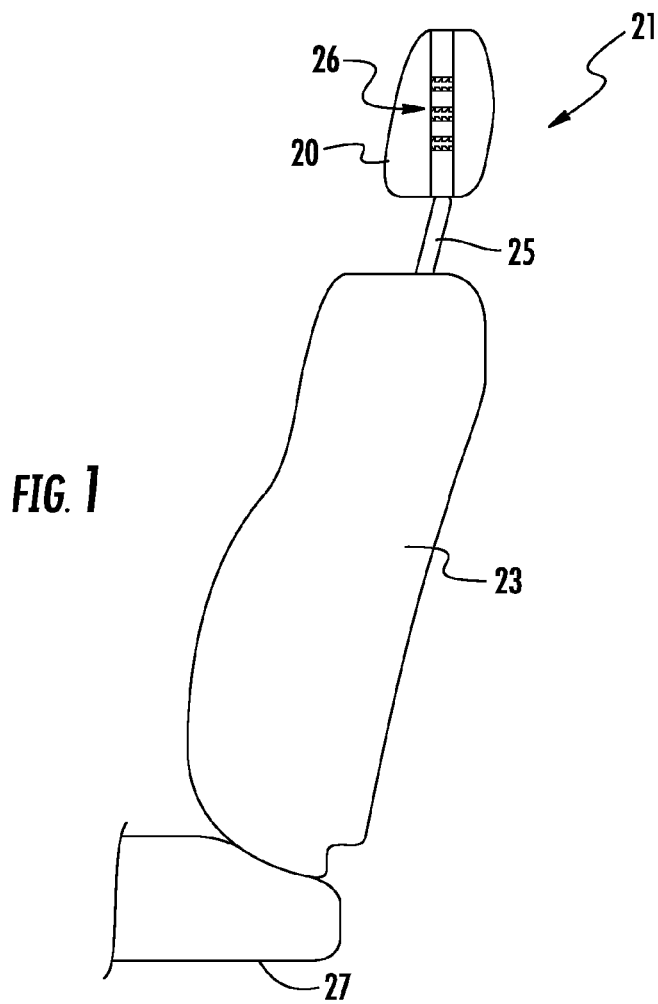
FIG. 1 is a schematic view of an exemplary vehicle seat assembly of the present disclosure.
Figure 2:
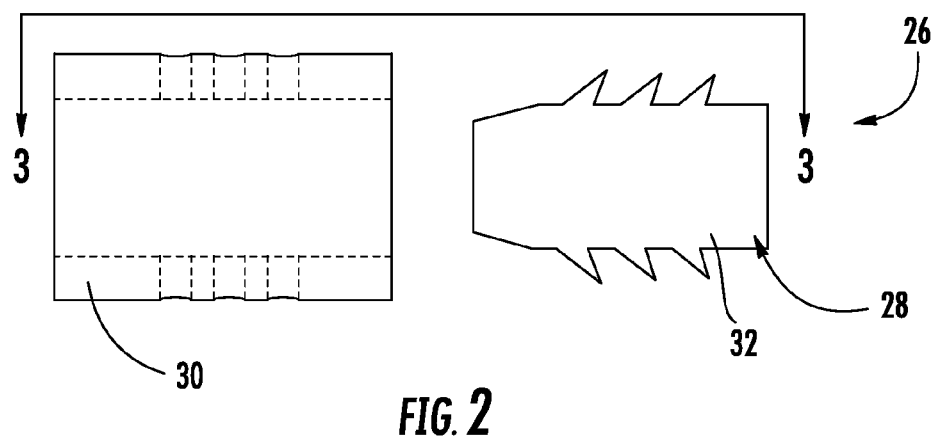
FIG. 2 is a perspective view of an exemplary fastening system of the present disclosure.
Figure 3A:
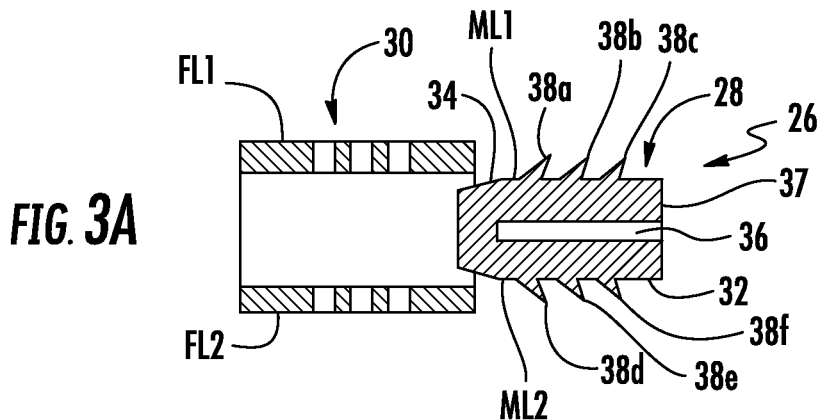
FIG. 3a is a cross-section view of a male member and a female member of the fastening system of FIG. 2.
Figure 3B:
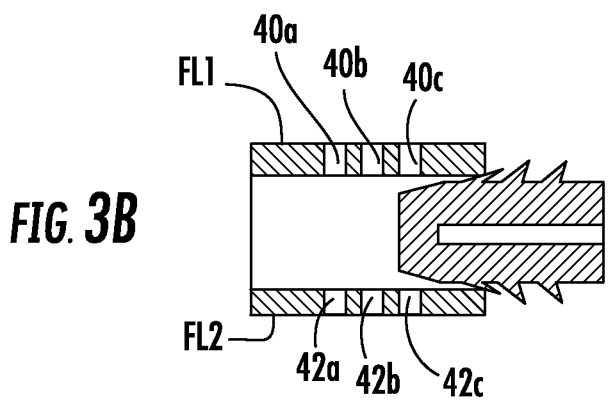
FIG. 3b is a cross-section view of the male member inserted into the female member.
Figure 3C:
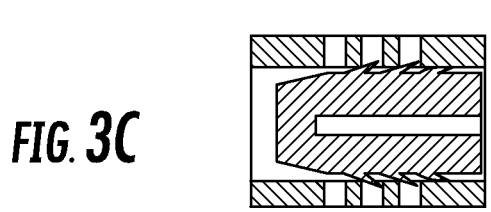
FIG. 3c is a cross-section view of the male member engaged with the female member.
Figure 3D:
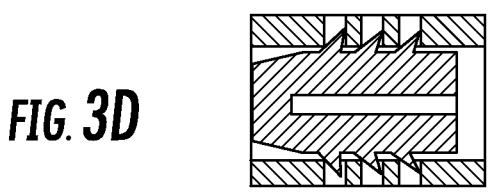
FIG. 3d is a cross-section view of the male member fully engaged with the female member.

With reference to FIG. 1, the present disclosure discloses a vehicle seat assembly 21 that includes, among other things, a headrest 20, a back rest 23, a headrest support bar 25 connecting the headrest 20 and the back rest 23, and a seat 27 positioned below the back rest 23. The vehicle seat assembly includes an exemplary fastening system 26 that may be used to assemble the headrest 20. Referring now to FIG. 2, the exemplary fastening system 26 preferably includes a male member 28 and a female member 30. The male member 28 preferably includes a body 32 with a diameter that is less than the diameter of the female member 30. The body 32 of the male member 28 may further include a tapered head 34 and a substantially flat bottom 37 opposite the tapered head 34 (FIG. 3a). The tapered head 34 preferably has a smaller diameter than the flat bottom 37. A release channel 36 is preferably formed within the body 32 along its axis and is configured to accommodate a disassembly tool (not shown).

The male member 28 preferably further includes a plurality of angled protrusions 38a-f configured to be engaged with the female member 30. The angled protrusions 38a-f are preferably positioned along the length or periphery of the body 32 and may be created in pairs. In the example shown in FIG. 3a-3d, three angled protrusions 38a-c are positioned in series on a first length ML1 or periphery of the body 32 and three angled protrusions 38d-e are positioned in series on a second length ML2 or periphery of the body 32. The first length ML1 and the second length ML2 are preferably opposing peripheries of the body 32. A line of symmetry may be drawn along the body axis or the release channel 36, and it can be appreciated that the exemplary male member 28 includes symmetrical faces. It is noted that the number of angled protrusions may be varied. The positions of the angled protrusions may also be varied. For instance, the angled protrusions need not be in pairs, or they may be in pairs but may be asymmetrically positioned or staggered. The angled protrusions are shown to be angled towards the bottom of the body in FIGS. 3a-3d thereby forming a hook, but in other examples not shown, they may be straight or angled towards the tapered head 34 of the male member 28.

The male member 28 is preferably made of plastic or any known flexible material so that the angled protrusions may flex as the male member 28 is inserted into the female member 30. The female member 30 is preferably cylindrical in shape and is hollow. The female member 30 preferably includes a first length FL1 or periphery that defines one or more receiving recesses 40a-c configured to receive the angled protrusions 38a-38c and a second length FL2 or periphery that defines one or more receiving recesses 40d-e configured to receive the angled protrusions 38d-e. Where multiple receiving recesses are formed on the female member, the receiving recesses are preferably arranged in series or such that one receiving recess follows another in succession. Of course, the number and placement of the receiving recesses may be varied, depending on the desired design of the male and female members. It can be appreciated from FIGS. 3a-3d that a disassembly tool, such as a pin, can be inserted through the release channel 36 of the male member and pushed against the tapered head 34 of the male member 28 to release the protrusions 38a-f from their respective receiving recesses 40a-e thereby detaching the male member 28 from the female member 30.

Figure 4A:
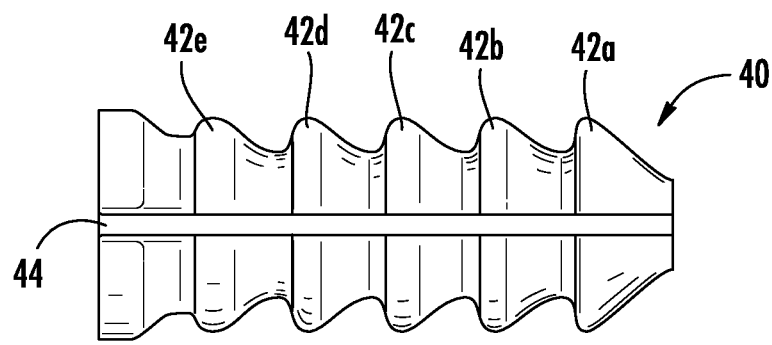
FIG. 4a is a side view of another exemplary male member.
Figure 4B:
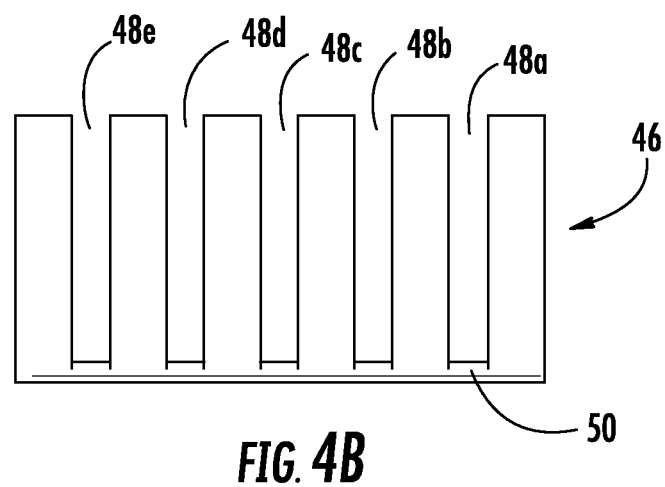

Referring now to FIG. 4a, another exemplary male member 40 is shown. The exemplary male member 40 preferably includes a body that defines a release channel just like that of male member 28 (not shown). Instead of the angled protrusions 38a-f that have the hook structures, the male member 40 preferably includes multiple protrusions that surround the body 42a-e and arranged in series. The multiple protrusions 42a-e are preferably substantially conical and may resemble the shape of an umbrella top or a mushroom with an elongated gap 44. The elongated gap 44 is created so that the female member 46 shown in FIG. 4b can be made with one piece of material. The female member 46 may include receiving recesses 48a-e that correspond to the protrusions 42a-e. As the receiving recesses 48a-e extend almost all through the periphery of the female member 46, a peripheral strip 50 preferably holds the female member 46 together. The male member 40 may be inserted into the female member 46. The protrusions 42a-e preferably go into their respective receiving recesses 48a-e, and the elongated gap 44 is preferably aligned with the peripheral strip 50.

Figure 5:
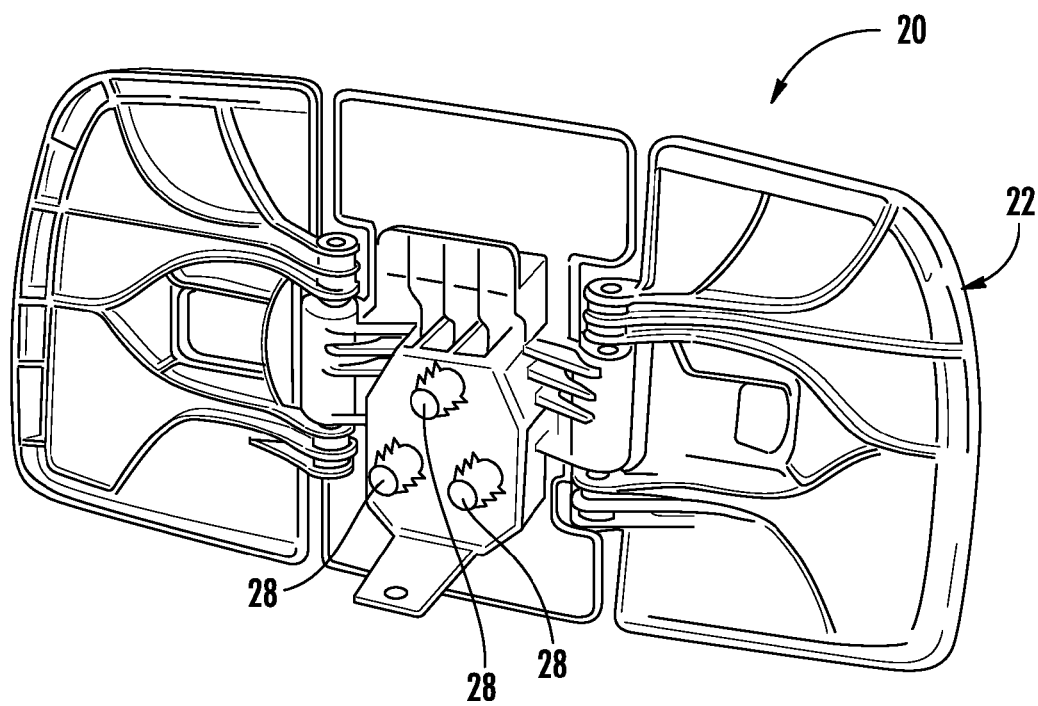
FIG. 5 is a perspective view of a first headrest plate with the male member.
Figure 6:
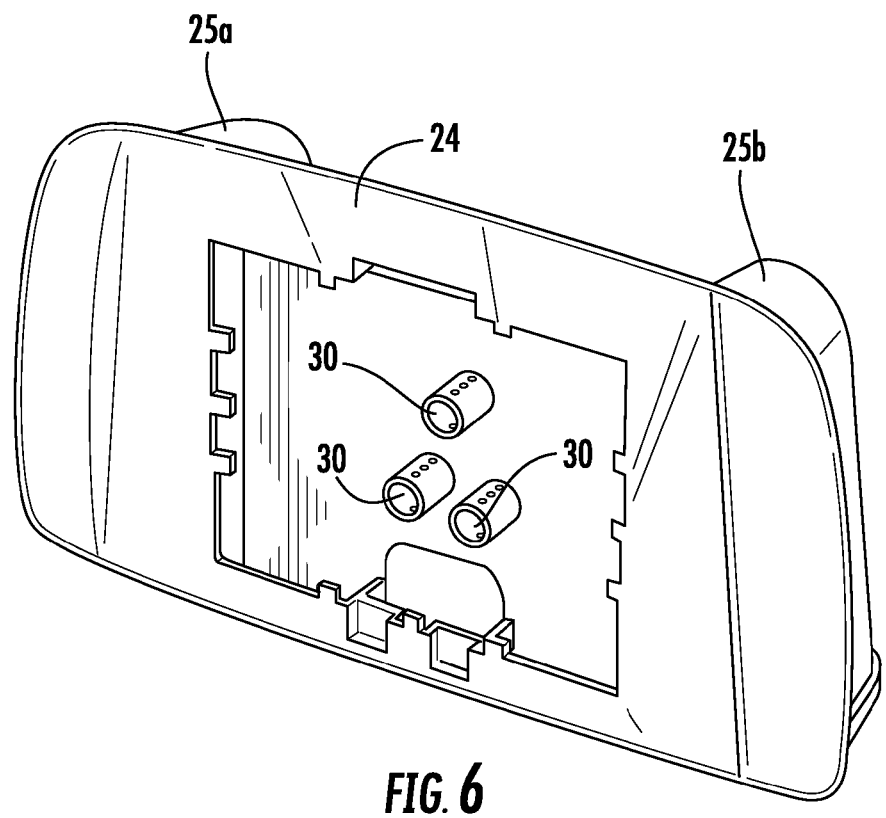
FIG. 6 is a perspective view of a second headrest plate with the female member.

An exemplary use of the fastening system 26 to assemble the headrest components can be seen in FIGS. 5 and 6. A plurality of male members 28, a corresponding set of female members 30, and headrest components, such as a first headrest plate 22 and a second headrest plate 24, may be used to assemble a headrest 20. The second headrest plate 24 may include headrest support bar receivers 25a and 25b, which is where the headrest support bar (not shown) may be attached to connect the headrest with the back rest (not shown). A headrest cushion member (not shown) may be applied to cover the first and second headrest plates after they have been joined together by the fastening system 26. In the example shown in FIGS. 5 and 6, the bottom of three male members 28 may be attached to a center portion of a first headrest plate 22. The male members 28 may be molded with the first headrest plate 22 in manufacturing the first headrest plate 22. Alternatively, they may be glued or attached to the first headrest plate 22 in any manner known in the art. The first headrest plate 22 may define release channel extensions (not shown) configured to accommodate a disassembly tool and allow the disassembly tool to reach the release channel 36 of the male members.

A plurality of female members 30 may be attached to a corresponding center portion of a second headrest plate 24. The female members 30 may also be molded with the second headrest plate 24 when manufacturing the second headrest plate 24, welded, or they may be attached to the second headrest plate 24 in any manner known in the art. In the example shown in FIGS. 5 and 6, the three male members 28 are positioned on the center plate of the first headrest plate 22 in a triangle formation. The three female members 30 may also be positioned on the center plate of the second headrest plate 24 in a triangle formation so the three male members 28 may insert to the female members 30 when the first headrest plate 22 and the second headrest plate 24 are aligned together. It is noted that the triangular orientation is just an example and should not be construed to be the only orientation for the male and female member sets.

To assemble the headrest 20, the sets of male and female members may be aligned together, and the first headrest plate 22 and the second headrest plate 24 may be pressed against each other. As the first headrest plate 22 and the second headrest plate 24 are pressed against each other, the male members 28 will insert to the female members 30, and specifically the protrusions of the male members will engage with their receiving recesses from the female members. It can be realized that with the fastening system 26, the number of headrest manufacturing steps may be minimized. For instance, the fastening system 26 may eliminate some or all steps that may require fastening headrest components using mechanical screws. The mechanical screws may have to be manually twisted or may have to be drilled one by one, which is more labor intensive and slower than just pressing the headrest components to where the male and female members are attached. It can further be realized that the fastening system 26 may eliminate the risk of headrest components being loosely joined together, as the fastening system 26 provides haptic feedback in that the assembler would feel whether or not the male members are completely inserted into the female members. The assembler may feel how many protrusions have gone into their respective receiving recesses. The assembler may not need to worry about not applying enough torque to the screws, or not engaging some screws or clips.

If the headrest assembled using the fastening system 26 need to be disassembled, such as for quality reasons, the male members can be detached from the female members by inserting a disassembly tool into the release channel extension of the first headrest plate and through the body of the male member. A disassembly tool, such as a pin, can be inserted through the release channel 36 of the male member and pushed against the tapered head 34 of the male member 28 to release the protrusions 38*a-f* from their respective receiving recesses 40*a-e* thereby detaching the male member 28 from the female member 30. Since the headrest components may not be permanently fastened by the fastening system, the headrest components need not be scrapped. For instance, instead of scrapping the headrest components, the male and female members of the fastening system 26 may be replaced. Thus, the fastening system 26 may reduce manufacturing scrap rate.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A headrest comprising:
   first and second headrest components; and
   a fastening system for fastening the first and second headrest components together, the fastening system including:
   a male member including a body defining a release channel configured to accommodate a tool and a plurality of flexible protrusions positioned on and extending away from a periphery of the body; and
   a female member defining a plurality of receiving recesses that receive the plurality of flexible protrusions to fasten the first and second headrest components together, wherein the first headrest component is detached from the second headrest component by detaching the male member from the female member.

2. The headrest of claim 1, wherein the male member includes a head with a diameter that is less than a diameter of the body.

3. The headrest of claim 1, wherein the fastening system includes a plurality of male members and female members.

4. The headrest of claim 1, wherein the male member is molded with the first headrest component.

5. The headrest of claim 4, wherein the female member is molded with the second headrest component.

6. The headrest of claim 4, wherein the female member is welded to the second headrest component.

7. The headrest of claim 1, wherein the second headrest component is configured to be attached to a headrest support bar that connects the headrest to a back rest.

8. A vehicle seat assembly comprising:
   a back rest;
   a headrest support bar connected to the back rest; and
   a headrest connected to the headrest support bar, the headrest including first and second headrest components and a fastening system for joining together the first and second headrest components, the fastening system comprising:
   a female member attached to the second headrest component; and
   a male member that is attached to the first headrest component and insertable into the female member, the male member including a body and a series of flexible protrusions positioned on and extending away from a first periphery of the body, the female member defining a series of receiving recesses on a first female member periphery, wherein the first and second headrest components are joinable together when the series of flexible protrusions are received in the series of receiving recesses.

9. The vehicle seat assembly of claim 8 wherein the headrest support bar attaches to a first plate of the headrest, the headrest including a second plate, the first plate and the second plate being attached together by the fastening system.

10. The vehicle seat assembly of claim 8 wherein the body of the male member defines a release channel configured to accommodate a tool for releasing the male member that is inserted in the female member.

11. The vehicle seat assembly of claim 8 wherein the male member further includes a second series of flexible protrusions positioned on a second periphery of the body, the first periphery opposing the second periphery.

12. The vehicle seat assembly of claim 11 wherein the first periphery and the series of flexible protrusions positioned thereon are symmetrical to the second periphery and the second series of flexible protrusions positioned thereon.

13. The vehicle seat assembly of claim 11 wherein the female member defines a second series of receiving recesses on a second periphery, the second periphery being opposite to the first female member periphery.

14. A headrest for use with a vehicle seat comprising:
   first and second components;
   a male member attached to the first component, the male member including a body and a series of flexible protrusions positioned on and extending away from a first periphery of the body; and
   a female member attached to the second component, the female member configured to accommodate the male member, the female member defining a series of receiving recesses configured to receive the series of flexible protrusions of the male member, wherein the first and second components are attachable together by inserting the male member into the female member until the series of flexible protrusions are received in the series of receiving recesses of the female member.

15. The headrest of claim 14 wherein the male member includes a tapered head configured to be inserted into the female member.

16. The headrest of claim 14 wherein the body of the male member defines a release channel configured to accommodate a tool, wherein when the tool is inserted into the release channel, the male member becomes removable from the female member.

17. The headrest of claim 14 wherein the body of the male member includes a second periphery opposite the first periphery, the second periphery including a plurality of flexible protrusions positioned thereon.

18. The headrest of claim 17 wherein the series of flexible protrusions on the first periphery align with the plurality of flexible protrusions on the second periphery.

19. The headrest of claim 17 wherein the female member includes an opposing first periphery and second periphery, the first periphery of the female member defining the series of receiving recesses configured to receive the series of flexible protrusions positioned on the first periphery of the body of the male member, the second periphery of the female member defining a plurality of receiving recesses configured to receive the plurality of flexible protrusions positioned on the second periphery of the body of the male member.

20. The headrest of claim 14 wherein the male members are molded with the first component of the headrest.

* * * * *